Patented Aug. 10, 1937

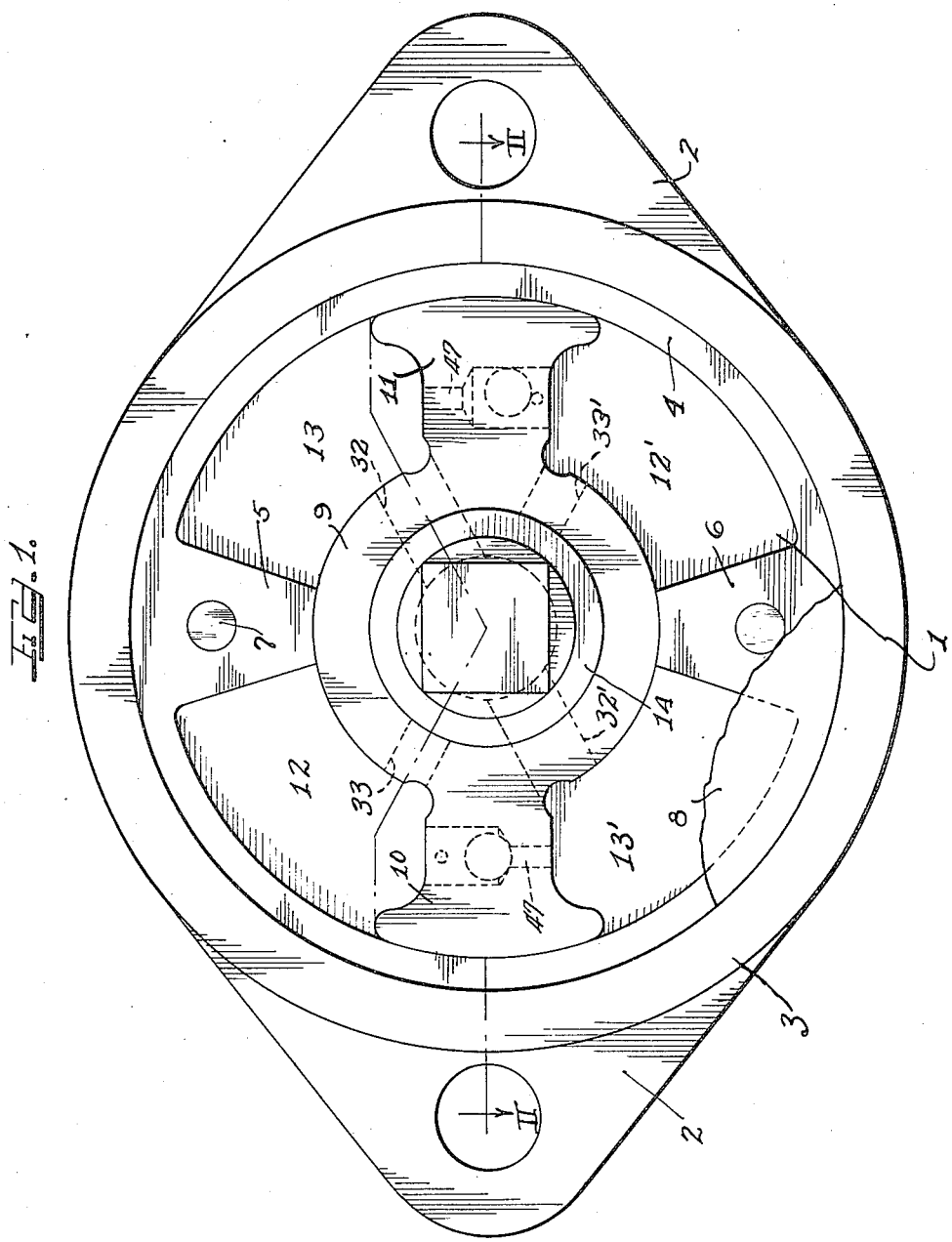

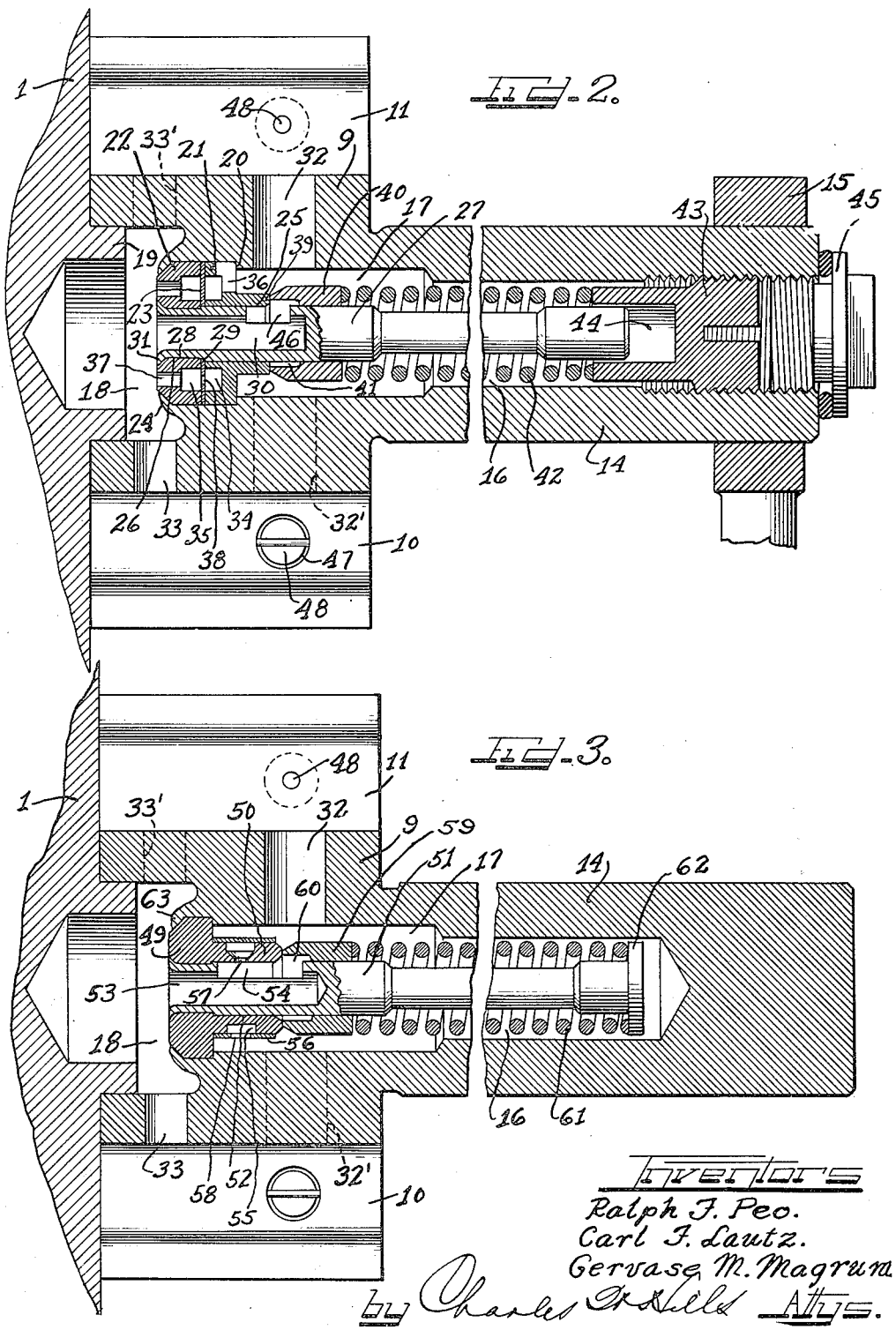

2,089,417

UNITED STATES PATENT OFFICE 2,089,417

VALVING ASSEMBLY FOR HYDRAULIC SHOCK ABSORBERS

Ralph F. Peo, Carl F. Lautz, and Gervase M. Magrum, Buffalo, N. Y., assignors to Houde Engineering Corporation, Buffalo, N. Y., a corporation of New York Application January 17, 1936, Serial No. 59,501

18 Claims. (Cl. 188—100)

This invention relates to valving structure and assembly which is particularly adaptable and serviceable for controlling the displaced hydraulic fluid flow in hydraulic shock absorbers on automotive vehicles.

The main object of the invention is to provide a valving assembly for efficiently controlling the fluid flow particularly during rebound movement of the vehicle springs and with the valving assembly comprising a short restricted orifice which will meter the hydraulic flow substantially independently of viscosity change in the fluid, together with a safety or blow-off valve movable by abnormal or excessive pressure to provide additional passageway so that the shock absorber and the connecting levers, links and fittings, as well as the frame of the car will not be subjected by abnormal stress and strain when abnormal road conditions are encountered, adjustment being preferably provided so that the blow-off valve will not function until a predetermined abnormal pressure is reached, and then only momentarily until normal pressure conditions have been reestablished.

Another feature of the invention is the provision of pressure reducing chambers in association with the orifice valve for reducing the swish noise due to the high pressure flow through the orifice at certain stages, and the provision of a pressure chamber for the blow-off valve in which the pressure builds up under abnormal pressure conditions until the pressure of the valve movement resisting the spring is overcome for blow-off operation of the valve.

The various features of the invention are incorporated in the structure disclosed on the accompanying drawings, in which drawings—

Figure 1 is a plan view of a hydraulic shock absorber with parts of the cover removed;

Figure 2 is a section on plane II—II of Figure 1 of the piston structure showing one form of our improved valving arrangement therein;

Figure 3 is a view similar to Figure 2 but shows a modified valving arrangement.

The shock absorber to which we have shown the valving assemblies applied is of the socalled rotary type. Briefly describing the structure it comprises a base 1 having ears 2 for securing it to a support as for example the chassis of an automobile. The annular wall 3 extends from the base and within this wall is the ring 4 from which extend the abutment partitions 5 and 6, this ring structure being secured by pins 7 extending through the abutment partitions and into the base 1. The outer end of the annular wall 3 is closed by a cover structure 8 which may be secured by threaded engagement with the wall 3.

Within the ring 4 is the cylindrical piston hub 9 which extends between the abutment partitions 5 and 6 and which has piston vanes 10 and 11 extending therefrom for bearing engagement with the ring, this piston structure together with the partition members dividing the space within the ring and between the base and cover structure 8 into high pressure chambers 12 and 12' and low pressure chambers 13 and 13' from which the oil is displaced as the piston structure oscillates.

A shaft 14 extends from the piston hub 9 and at its outer end is journaled in the cover structure 8 in a well-known manner, the shaft at its outer end having applied thereto a lever 15 (Figure 2) for connection usually with the axle of the vehicle so that during relative movement between the chassis and axle the piston structure will be oscillated for displacement of the hydraulic fluid.

Referring particularly to Figure 2, the shaft 14 has the cylindrical bore 16 communicating with an intermediate bore 17 within the hub 9, the inner end of the hub having the cylindrical cavity or bore 18 of larger diameter than the intermediate bore, the bore 18 receiving the bearing and aligning lug 19 on the base 1 for journaling the piston structure at its inner end.

Describing now the valving arrangement disclosed on Figure 2, the intermediate bore 17 provides a valve chamber. Seated in the inner end of the bore 17 against a shoulder 20 is the seat member 21 and between this seating member and a clamping member 22 is clamped a valve disc 23 of comparatively thin sheet metal such as steel. The assembly including the seating member 21, the valve disc, and the clamping member 22 is securely held in place as by deflecting against the outer end of the clamping members the metal at the edge of the bore 17 as indicated at 24.

The seating member 21, the valve disc and the clamping member 22 have axial bores 25 and 26 for receiving the inner end of a cylindrical stem 27, the bore 26 being of slightly less diameter than the bore 25 to receive the correspondingly reduced neck 28 of the stem and to provide a shoulder 29 against which the stem abuts. The inner end of the stem has the bore 30 and the metal around the inner edge of the stem is deflected against the beveled end of the bore 26 in the clamping member as indicated at 31 so that the stem is rigidly secured to the clamping member and is intimately surrounded by the seating member 21.

The assembly involving the members 21, 22 and 23 is interposed between the valve chamber 17 and the chamber 18. The valve chamber 17 is connected with the low pressure working chambers of the shock absorbers by passages 32 and 32' extending radially through the piston structure hub 9, while the chamber 18 is connected with the high pressure working chambers of the shock absorber by passages 33 and 33'.

The seating member 21 has the annular chamber 34 therein while the clamping member 22 has the annular chamber 35 therein in registration to the chamber 34, the valve disc 23 being disposed between and forming the inner wall for the chambers. The chamber 34 is connected by a port 36 with the valve chamber 17 and the chamber 35 is connected by one or more ports 37 with the chamber 18 which is connected through passages 33 and 33' with the high pressure working chambers of the shock absorber. The valve disc has a restricted orifice 38 therethrough for communication between the chambers 35 and 34, the displaced fluid, during rebound movement of the vehicle springs, being from the high pressure shock absorber working chambers 12 and 12' through the passages 33 and 33' and through the ports 37 into the annular chamber 35 and from there through the orifice 38 into the annular chamber 34 and thence thru port 36 into the valve chamber 17 and to passages 32 and 32' to the low pressure working chambers 13 and 13'. In order to eliminate swish noise of the flow through the orifice, the orifice is located preferably diametrically opposite to the location of the port 36 so that the flow through the port 37 is first distributed in the annular chamber 35 before the flow passes through the orifice into chamber 34, and the flow must then be across the chamber 34 before the port 36 is reached, the chambers 34 and 35 thus acting to gradually reduce the pressure energy which will result in elimination of swishing flow through the orifice which might otherwise occur, and the shock absorber operation will be noiseless.

The seat member 21 has an outwardly extending annular flange 39 forming a continuation of the bore 25 and forming a seat for the blow-off valve 40 mounted and slidable on the stem 27. At its inner end this valve has the counter bore 41 of larger diameter than the stem so as to provide an annular chamber, and the annular end of the valve seats against the outer end of the seating flange 39. The stem 27 extends a distance into the shaft bore 16 and is surrounded by a helical spring 42 which at its inner end abuts against the blow-off valve 40 and at its outer end abuts against an adjusting plug 43 having threaded engagement in the shaft bore, the plug having a guide bore 44 for receiving the outer end of the stem. By means of the plug 43 the spring 42 may be set for a predetermined constant pressure against the blow-off valve 40. After adjustment of the spring by the plug the shaft bore may be closed at its outer end as by a plug 45.

The valve stem 27 is transversely slotted to provide a port 46 between the stem bore 30 and the counter bore or chamber 41 in the blow-off valve 40. During normal pressure conditions all of the displaced hydraulic fluid during rebound operation of the vehicle springs will flow from the high pressure working chambers to the low pressure chambers solely by way of the restricted orifice 38 in the valve disc 23, but under abnormal pressure conditions pressure will build up in the stem bore 30 and in the blow-off valve chamber 41 until the spring pressure against the valve is overcome whereupon the blow-off valve will be shifted by the pressure along the stem 27 away from the seating flange 39 so that an additional passageway for fluid flow is provided by way of the stem port 46, the blow-off valve chamber 41 and the opening between the unseated blow-off valve and its seat, but as soon as the pressure returns to normal the spring 42 will reseat the blow-off valve so that the fluid flow will again be confined to the restricted orifice. As shown, the annular end of the blow-off valve is beveled or tapered so as to have a thin edge seating engagement with the seating flange 39 and such arrangement will prevent sudden increase of pressure against the blow-off valve upon unseating thereof as with this thin edge engagement there will be no material increase in pressure area presented by the valve when it is unseated.

Briefly repeating the operation, during rebound movement of the vehicle springs with which the shock absorber is associated, the piston structure will rotate in clockwise direction (Figure 1) and the hydraulic fluid displaced from the high pressure working chambers 12 and 12' will all flow through the restricted orifice 38 during normal pressure conditions, the short restricted orifice metering the flow substantially uninfluenced by viscosity change in the hydraulic fluid. Under abnormal pressure conditions the blow-off valve will be unseated as soon as the pressure becomes sufficient to overcome the resistance of the spring 42 and then the additional passageway for the fluid past the unseated blow-off valve will relieve the excess pressure and when normal pressure is again reached the spring will reseat the blow-off valve.

During compression movement of the vehicle springs less hydraulic resistance is required and therefore the flow metering passages 47 are provided through the piston vanes 10 and 11 which passageways are provided with check valves such as balls 48 which open the passageways for flow from the low pressure working chambers to the high pressure chambers in addition to whatever flow there might be through the restricted orifice 38, during compression movements of the vehicle springs, but the check valves will close these passages during rebound movement of the vehicle springs so that all the flow must be through the restricted orifice. During blow-off movement of the blow-off valve it will be accurately guided by the stem 27 so that it will always accurately seat.

In the modified arrangement shown in Figure 3, the plug 49 seated in the inner end of the valve chamber 17 has the neck or projection 50 thereon and integral therewith, and the stem 51 extends through the bore 52 of the plug and its extension and is rigidly secured thereto and extends outwardly a distance through the shaft bore 16. The stem at its inner end has the bore 53 communicating with the chamber 18 and the stem is cut transversely to provide a lateral port 54 connecting the stem bore with the bore 52 of the flange 50. The flange has the outer circumferentially extending channel 55 whose outer wall is formed by a metal sleeve 56 intimately surrounding the flange. A short restricted orifice 57 through the flange 50 connects the circumferential chamber 55 with the port 52 in the valve stem and at a diametrically opposite point the sleeve 56 has the outlet port 58 which is of larger diameter than the orifice. During rebound movement of the vehicle springs with which the shock absorber is associated, the fluid displaced from the high pressure working chambers flows through the passages 33 and 33' into chamber 18 and into the bore of the stem, and from there through the stem port 54 and the restricted orifice 57 into the circumferential chamber 55, and from there through the port 58 into the valve chamber 17 from where the fluid escapes through passages 32 and 32' into the low pressure working chambers. The circumferential chamber 55 forms a pressure relief chamber for receiving the fluid after it has passed through the restricted orifice and swishing flow through the restricted orifice will be eliminated.

The blow-off valve 59 is arranged substantially the same as in the arrangement of Figure 1, the valve at its inner end being counterbored to provide an annular chamber 60 and the end of the valve being beveled or tapered to a thin edge for seating against the outer end of the plug flange 50. A spring 61 encircles the stem and abuts at its inner end the blow-off valve and its outer end abuts the head 62 provided on the outer end of the stem, the spring being of constant resistance.

The stem port 54 is of a sufficient length to communicate with the chamber 60 in the blow-off valve when the valve is seated. Under normal pressure conditions during rebound operation of the vehicle springs the spring 61 will hold the blow-off valve seated so that all the fluid flow must be by way of the restricted orifice 57. Under abnormal pressure conditions the pressure built up in the valve bore 60 will eventually overcome the resistance of the spring 61 and the blow-off valve will be unseated for opening an additional passage past the blow-off valve for the fluid.

In the arrangement of Figure 3 where the outer abutment for the spring is the head 62 on the stem 51 which is secured in the plug 49, a unitary self-contained valving assembly is provided. The valve structure is assembled outside of the shock absorber by inserting the stem into the plug structure 49 and then riveting over the end thereof to secure it rigidly to the structure The valve assembly may then be inserted into the shaft bore from the inner end thereof and the surrounding metal can be deflected against the outer side of the plug to hold the valve structure securely in place, as indicated at 63.

We have shown practical and efficient embodiments of the various features of our invention but we do not desire to be limited to the exact construction, arrangement and operation shown and described as changes and modifications are possible which will still come within the scope and spirit of the invention.

We claim as follows:

1. A valve structure for controlling the flow of hydraulic fluid between the hydraulic working chambers of a hydraulic shock absorber, said valve structure comprising a seating structure having a stem secured to and extending axially therefrom, said stem having a bore extending thereinto from its inner end, said seat structure having a fluid passageway therethrough and a restricted orifice interposed in said passageway, a blow-off valve shiftable on said stem and a spring normally holding said blow-off valve seated against said seat structure, said stem having a port connecting its bore with the space adjacent the seating end of said blowoff valve, said spring holding said blow-off valve seated against normal fluid pressure but yielding to abnormal pressure against the blow-off valve for unseating of said valve and opening of an additional passageway through said seating member by way of the stem bore, the stem port and the space between the unseated valve and its seat.

2. A valve assembly for controlling the flow of hydraulic fluid between the hydraulic working chambers of a hydraulic shock absorber, said valve assembly comprising a seat structure and a stem secured thereto and extending axially therefrom, said seat structure at its inner end providing an annular seat around said stem, a blow-off valve in the form of a sleeve shiftable on said stem and a spring engaging said blow-off valve to normally hold it seated against said seat, said stem having a bore extending thereinto from its inner end and having a port adjacent to the valve seat and communicating with the stem bore, said spring holding said blow-off valve seated under normal pressure conditions but yielding to abnormal pressure conditions for opening a fluid flow passageway including the stem bore, the stem port, and the space between the unseated blow-off valve and its seat.

3. A valve assembly for controlling the flow of hydraulic fluid between the hydraulic working chambers of a hydraulic shock absorber, said valve assembly comprising a seat structure and a stem secured at one end thereto and extending axially therefrom, the inner end of said seat structure forming a valve seat surrounding said stem, a blow-off valve in the form of a sleeve shiftable on and guided by said stem, a tension spring tending to hold said valve seated against said seat, said stem having a bore extending thereinto from its inner end and having a port communicating with said bore and with the space adjacent said seat, said spring being tensioned to hold said valve seated under normal pressure conditions but yielding to permit unseating movement of said valve whereby to open a fluid passageway including said stem bore, the stem port and the exposed space between the unseated valve and its seat, and a continuously open fluid passageway through said seat structure and a restricted orifice controlling the flow through said passageway.

4. A valve assembly for controlling the flow of hydraulic fluid between the hydraulic working chambers of a hydraulic shock absorber, said valve assembly comprising a seat structure and a stem secured at one end thereto and extending axially therefrom, the inner end of said seat structure forming a valve seat surrounding said stem, a blow-off valve in the form of a sleeve shiftable on and guided by said stem, a tension spring tending to hold said valve seated against said seat, said stem having a bore extending thereinto from its inner end and having a port communicating with said bore and with the space adjacent said seat, said spring being tensioned to hold said valve seated under normal pressure conditions but yielding to permit unseating movement of said valve whereby to open a fluid passageway including said stem bore, the stem port and the exposed space between the unseated valve and its seat, and a continuously open fluid passageway through said seat structure and a restricted orifice controlling the flow through said passageway, said continuously open passageway including part of the stem bore and the stem port.

5. A valve assembly for controlling the flow of hydraulic fluid between the hydraulic working chambers of a hydraulic shock absorber, said valve assembly comprising a seat structure adapted for interposition between the high and low pressure working chambers of a hydraulic shock absorber, a stem secured at one end to and extending axially from said seat structure, the inner end of said seat structure forming an annular valve seat, a blow-off valve sleeved on said stem and a tension spring surrounding said stem and engaging said valve, said stem having a passageway extending thereinto from its inner end and having a port communicating with said passageway and the space adjacent said seat, said spring being tensioned to hold said valve seated during normal fluid pressure conditions but to yield to abnormal pressure to permit unseating of the valve for the opening of a fluid passageway through said seating structure including said stem passageway and port and the space between said seat and the unseated valve, and a continuously open passageway through said seating structure having a short restricted metering orifice interposed therein.

6. A valve assembly for controlling the flow of hydraulic fluid between the hydraulic working chambers of a hydraulic shock absorber, said valve assembly comprising a seat structure adapted for interposition between the high and low pressure working chambers of a hydraulic shock absorber, a stem secured at one end to and extending axially from said seat structure, the inner end of said seat structure forming an annular valve seat, a blow-off valve sleeved on said stem and a tension spring surrounding said stem and engaging said valve, said stem having a passageway extending thereinto from its inner end and having a port communicating with said passageway and the space adjacent said seat, said spring being tensioned to hold said valve seated during normal fluid pressure conditions but to yield to abnormal pressure to permit unseating of the valve for the opening of a fluid passageway through said seating structure including said stem passageway and port and the space between said seat and the unseated valve, and a continuously open passageway through said seating structure having a short restricted metering orifice interposed therein, said continuously open passageway including said stem passageway and port.

7. A valve assembly for controlling the flow of hydraulic fluid between the hydraulic working chambers of a hydraulic shock absorber, said valve structure comprising a seat structure having a stem extending axially therefrom, the inner end of said seat structure forming an annular seat surrounding said stem, a blow-off valve in the form of a sleeve slidable on said stem, a spring tending to hold said valve seated against said seat, said valve being counterbored at its inner end to provide an annular chamber surrounding said stem, said stem having a fluid passageway and a port connecting said passageway with said annular valve chamber, said spring being tensioned to hold said valve seated against normal fluid pressure but yielding to abnormal pressure to permit unseating movement of the valve whereby to open a fluid passageway including said stem passageway and port and said valve chamber and the opening between said seat and the unseated valve.

8. A valve assembly for controlling the flow of hydraulic fluid between the hydraulic working chambers of a hydraulic shock absorber, said valve structure comprising a seat structure having a stem extending axially therefrom, the inner end of said seat structure forming an annular seat surrounding said stem, a blow-off valve in the form of a sleeve slidable on said stem, a spring tending to hold said valve seated against said seat, said valve being counterbored at its inner end to provide an annular chamber surrounding said stem, said stem having a fluid passageway and a port connecting said passageway with said annular valve chamber, said spring being tensioned to hold said valve seated against normal fluid pressure but yielding to abnormal pressure to permit unseating movement of the valve whereby to open a fluid passageway including said stem passageway and port and said valve chamber and the opening between said seat and the unseated valve, and a continuously open passageway through said seating structure controlled by a short restricted orifice.

9. A valve structure for controlling the flow of hydraulic fluid between the hydraulic working chambers of a hydraulic shock absorber, said valve assembly comprising a seat structure having a stem extending axially therefrom, said seat structure being composed of inner and outer members having aligned annular chambers, a thin metal disk clamped between said members to form a wall between said annular chambers and having a restricted short orifice therethrough for communication between said annular chambers, a port connecting the annular chamber of the inner member with the exterior of the seat structure and a port connecting the annular chamber of the outer member with the exterior of said seating structure, said ports and said annular chambers and said restricted orifice forming a continuously open passageway through said seating structure, the inner end of said seating structure forming an annular valve seat surrounding said stem, said stem having a passageway therethrough, a blow-off valve guided on said stem, and a spring tensioned to hold said valve seated under normal fluid pressure conditions whereby to close the passageway through said stem but said spring yielding for unseating of said blow-off valve by the fluid pressure to thereby open said stem passageway.

10. A valve assembly for controlling the flow of hydraulic fluid between the hydraulic working chambers of a hydraulic shock absorber, said valve assembly comprising a seating structure having a stem extending axially therefrom and secured thereto, the inner end of said seating structure forming an annular valve seat around said stem, a blow-off valve in the form of a sleeve slidable on said stem, a spring tending to hold said blow-off valve against said seat, said seating structure having a restricted port therethrough, said stem having a passageway and a port communicating therewith and spanning said restricted port and said valve seat, said stem passageway and said stem port and said restricted port forming a continuously open fluid passageway, said spring yielding under abnormal fluid pressure to permit unseating of said blow-off valve by the fluid pressure whereby to open a second fluid passageway including said stem passageway, said stem port and the opening between said seat and the unseated valve.

11. A valve assembly for controlling the flow of hydraulic fluid between the working chambers of a hydraulic shock absorber, said valve assembly comprising a seating structure having a stem extending axially therefrom, the inner end of said seat structure providing an annular seat surrounding said stem, a continuously open passageway through said seat structure and a short restricted orifice interposed in said passageway, a blow-off valve in the form of a sleeve guided on said stem, said stem having a fluid passageway communicating with the space adjacent said seat, a spring surrounding said stem, adjusting means for tensioning said spring to resist unseating of said blow-off valve under normal fluid pressure conditions but yielding to abnormal pressure conditions to permit unseating of said blow-off valve whereby to open a second path for fluid flow through said stem passageway and the space opened by the unseating of said blow-off valve.

12. A unitary valve assembly for controlling the flow of hydraulic fluid between the hydraulic working chambers of a hydraulic shock absorber, said valve assembly comprising a seat structure having a stem extending axially therefrom, a continuously open fluid passageway through said seat structure and a short restricted orifice controlling the flow through said passageway, the inner end of said seat structure forming an annular valve seat surrounding said stem, a blow-off valve shiftable on said stem for engaging said seat, said stem having a passageway therethrough communicating with the space adjacent said seat, a spring surrounding said stem and abutting at its inner end against said blow-off valve, an abutment head on said stem for the outer end of said spring, said spring being tensioned to resist unseating of said blow-off valve under normal fluid pressure conditions but to yield for unseating of said valve under abnormal fluid pressure conditions to open a second fluid passageway including said stem passageway and the exposed space between said seat and the unseated valve.

13. A valving structure for controlling the fluid flow in a hydraulic shock absorber having a piston structure with an axial bore connected with the working chambers of the shock absorber, said valving assembly comprising a seat structure mounted in said shaft bore at one end thereof and having a stem extending axially into said bore, said seat structure having a continuously open passageway therethrough for fluid flow from the high pressure to the low pressure shock absorber working chambers and a short restricted orifice interposed in said passageway for metering the flow therethrough, the inner end of said seat structure forming an annular seat surrounding said stem, a blow-off valve shiftable on said stem for cooperating with said seat, said stem having a bore connected by a port with the space adjacent said seat, and a spring tensioned to hold said blow-off valve seated during normal fluid pressure conditions but yielding to abnormal pressure conditions to permit unseating of said blow-off valve and the opening of a second fluid passageway including the stem bore and port and the exposed space between said seat and unseated valve.

14. A valving assembly for controlling the flow of fluid between the high pressure and low pressure working chambers of a hydraulic shock absorber, said valve assembly comprising a seat structure and a stem extending therefrom coaxial therewith, a continuously open fluid flow passageway through said seat structure, means interposing a short restricted metering orifice in said passageway and a pressure reducing chamber for receiving the flow from the orifice, the inner end of said seat structure forming an annular seat surrounding said stem, a blow-off valve in the form of a sleeve slidable on said stem for seating at its inner end against said seat, said valve having an annular chamber at its seating end surrounding said stem, said stem having a bore and a port connecting said bore with said valve annular chamber, and a spring tensioned to hold said valve seated against normal fluid pressure conditions but to yield to abnormal pressure conditions to permit unseating of said valve for opening of a second fluid flow passageway including said valve bore and port, said annular valve chamber and the exposed opening between said seat and the unseated valve.

15. A valve assembly for controlling the flow of hydraulic fluid between the hydraulic working chambers of a shock absorber, said valve assembly comprising a seat structure and a supporting member carried thereby and coaxial therewith, the end of said seat structure forming an annular seat surrounding said supporting member, an annular blow-off valve slidable on said supporting member to and from said annular seat, said blow-off valve being counterbored adjacent to its seat end to provide a pressure chamber, said seat structure having a fluid passageway therein communicating with said pressure chamber, and a spring tensioned to hold said blow-off valve seated against normal fluid pressure in said passageway and pressure chamber but yielding to abnormal pressure to permit unseating of the blow-off valve for fluid flow through said passageway.

16. A valve assembly for controlling the flow of hydraulic fluid between the working chambers of a hydraulic shock absorber, said valve assembly comprising a seat structure and a stem extending therethrough, the end of said seat structure forming an annular seat surrounding said stem, an annular blow-off valve slidable on said stem to and from said seat, said blow-off valve being shaped to present an internal pressure surface, said stem having a fluid passageway extending therein to which said pressure surface is exposed, and a spring acting to hold said valve seated against normal fluid pressure but yielding to abnormal pressure against said surface to permit unseating movement of the valve for fluid flow through said passageway.

17. A valve assembly for controlling the flow of hydraulic fluid between the working chambers of a hydraulic shock absorber, said valve assembly comprising a supporting structure presenting an annular valve seat, an annular blow-off valve slidable on said supporting structure for cooperation with said seat, said supporting structure having a passageway therein for the inflow of fluid under pressure, means providing a restricted outlet for flow of fluid from said passageway, said blow-off valve having a pressure surface exposed to the fluid in said passageway, and a spring acting to hold said blow-off valve seated against normal pressure of the fluid flowing into said passageway but yielding to abnormal pressure to permit unseating of the blow-off valve whereby to provide flow outlet in addition to the restricted outlet.

18. A valve assembly for controlling the flow of hydraulic fluid between the hydraulic working chambers of a hydraulic shock absorber, said valve assembly comprising a seat structure, a supporting member in the form of a stem extending axially through and outwardly from said seat structure, the outer end of said seat structure forming an annular seat surrounding said stem, an annular blow-off valve outside of said seating structure and slidable on said stem to and from said annular seat, said stem having a fluid passageway therein for fluid flow therethrough when said blow-off valve is unseated, and a spring abutting the outer end of said stem and said valve and tensioned to hold said valve against normal fluid pressure but yielding to abnormal pressure to permit unseating of the valve for flow of fluid through said passageway.

RALPH F. PEO.
CARL F. LAUTZ.
GERVASE M. MAGRUM.